United States Patent Office 3,451,322
Patented June 24, 1969

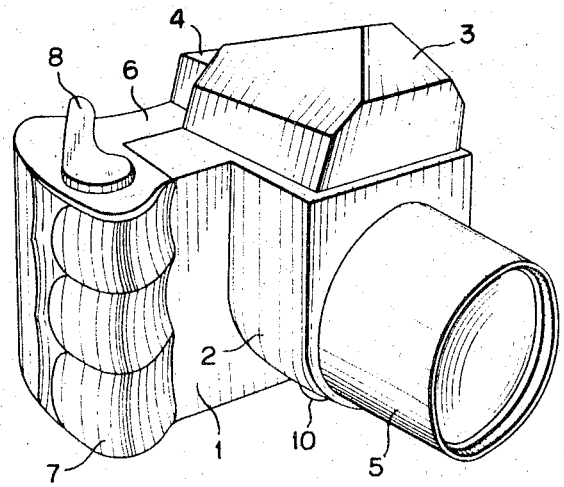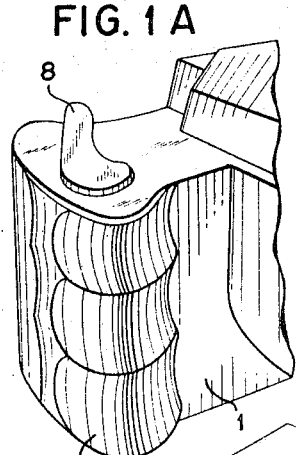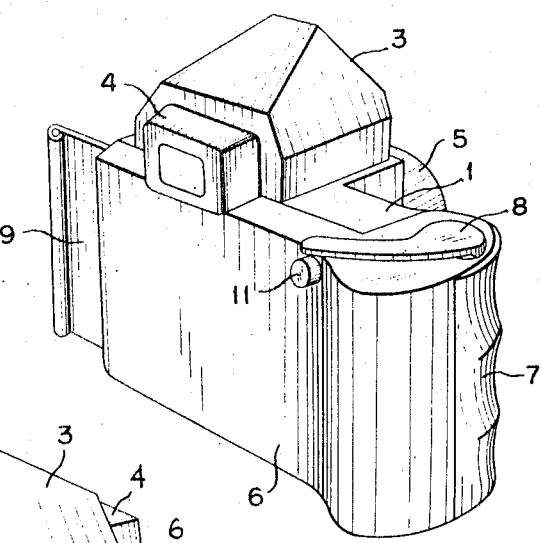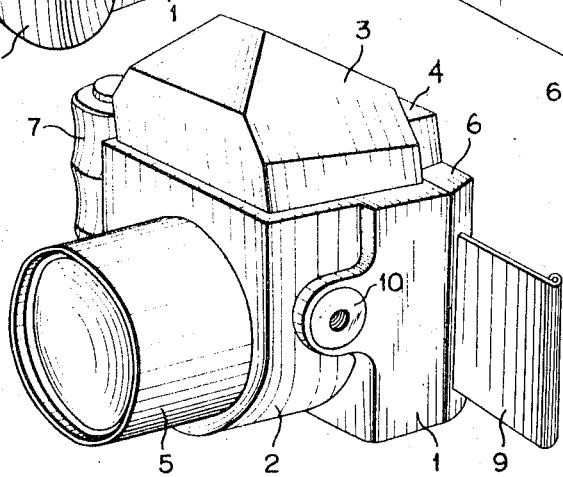

3,451,322
SINGLE LENS REFLEX CAMERA FOR ROLL-FILM
Seijiro Noda and Makoto Nakamura, Tokyo, Japan, assignors to Nippon Kogaku K.K., Tokyo, Japan, a corporation of Japan
Filed Dec. 27, 1966, Ser. No. 605,004
Claims priority, application Japan, Dec. 29, 1965, 40/107,599
Int. Cl. G03b 19/04, 19/20
U.S. Cl. 95—31       3 Claims

ABSTRACT OF THE DISCLOSURE

A single lens reflex camera provided with a removable film holder enclosing a film advancing mechanism including the film supply and take-up spools. A slidable light shield protects the film in the holder when the film holder is removed from the camera body. The film advancing mechanism is connected to the shutter charging mechanism of the camera when the holder is positioned on the camera body. A release button on the film holder engages the shutter release of the camera to release the camera shutter.

---

This invention relates to single lens reflex cameras and, in particular, to a single lens reflex camera for roll-film type.

In the conventional single lens reflex cameras, the camera body, lens and film advance mechanisms are designed symmetrically about the optical axis of the lens with little regard to the weight distribution of the camera. With the symmetrical layout of the camera, there is very little gripping surface on such cameras where the user of the camera can obtain a firm grip and steady support when the camera is hand-held. The difficulties of a steady support for such cameras are not confined to the hand held camera, but also to such cameras when mounted on a tripod. While some cameras are provided with a mounting nut on the bottom wall of the camera body, and where centered, no great problem arises in taking horizontal pictures. When however vertical pictures are to be taken, and the tripod head tilted, the unbalanced weight of the camera provides an unsteady and oftentimes a precarious mount for the camera. While such difficulties are not so prevlaent in the small 35 mm. camera, such difficulties are encountered in the larger cameras.

It is therefore the object of the present invention to provide a single lens reflex camera for roll-film overcoming the above-mentioned drawbacks.

In accordance with the present invention there is provided a single lens reflex camera for roll-film, wherein the camera body is provided with a mirror housing on the front wall of the body, the housing being so devised that the lower surface and one side thereof are coplanar with or slightly offset from the bottom wall and one side wall of the body, the optical axis of the camera being eccentric to the body, and wherein a film holder is provided in unison with or removably from the back of the camera body, one end portion thereof being formed as a hollow cylinder, the outer surface of which is contoured to provide a finger grip, the hollow cylinder enclosing the film and take-up mechanism.

The other objects, advantages and features of the present invention will be apparent from the following description referring to an illustrative embodiment shown in the drawing, in which:

FIG. 1 is a perspective front view of a reflex camera embodying an illustrative embodiment of the present invention;

FIG. 1A is a perspective and partial front view of a reflex camera embodying the present invention in which the film chamber being in unison with the camera body.

FIG. 2 is a perspective front view of the other side of the camera illustrated in FIG. 1;

FIG. 3 is a perspective rear view of the camera illustrated in FIG. 1;

Figure 4:
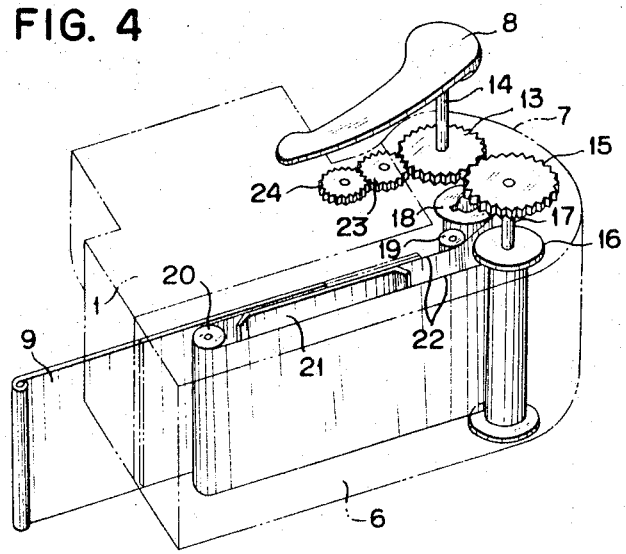
FIG. 4 illustrates the arrangement of the film chamber of the embodiment of FIG. 1.

In the drawings, 1 is the body of a single lens reflex type camera of rectangular dimensions and having a mirror housing 2 provided on the front portion thereof. The mirror housing is so devised that the lower surface 2a thereof is preferably a cylindrical surface while the sides 2b and 2c are planar and parallel. The mirror housing 2 is offset on the camera body 1 so that the cylindrical surface 2a and side 2b thereof are set back slightly from the bottom wall 1a and side wall 1b of the camera body as illustrated in FIG. 2. It will be understood that surface 2a and side 2b of the housing 2 may also be made flush with the camera body walls 1a and 1b. Secured to the top wall 1c of the camera body is a view finder compartment 3 provided with an eyepiece 4. A removable lens 5 is secured to the camera body in the usual manner, it being noted however that the optical axis of the lens is offcentered with respect to the camera body as is the mirror housing 2.

Secured to the rear of the camera body 1 by dentents or the like, is an L-shaped film holder 6 formed at one end with a hollow cylinder 7 so as to be easily gripped. A film advancing lever 8 is rotatably mounted on the upper surface of the film chamber. A light shield 9 slidably received by the film holder 6 permits the removal of the film holder from the camera body, sealing the film within the holder against extraneous light. Tripod mounting nuts 10 are provided on the cylindrical surface 2a and side wall 2b of the mirror housing. The side mounted nut 10 as illustrated is secured to a boss 1d provided on the camera body due to the offset of the mirror housing.

Figure 5:
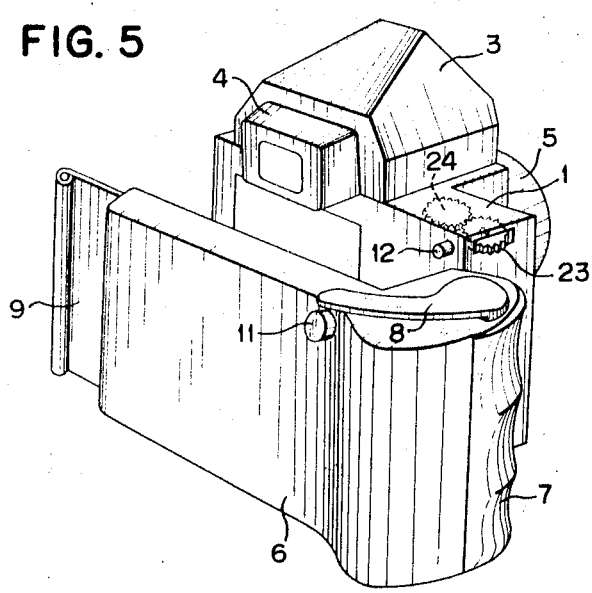
FIG. 5 illustrates the film chamber of FIG. 1 disassembled from the camera body.

A shutter button 11 is mounted on the rear of the film holder 6 and, as is shown in FIG. 5, when the film holder 6 is fitted to the body 1, the shutter bottom 11 engages a connecting button 12 to operate the shutter means provided within the body upon depression of the shutter button. Disposed within the cylindrical portion 7 is a film advance mechanism connecting the film advance lever 8 through a shaft 14, gears 13 and 15, through a shaft 17 to a take-up spool 16. A supply spool 18 is also mounted within the cylindrical portion of the film holder, the film 22 being advanced upon ratcheting of the lever 8 over press plate 21 and guide rollers 19 and 20. On the top wall of the camera body 1 are two meshing gears 23 and 24, gear 23 meshing with the advancing gear 13 when the film holder 6 is in place on the camera body. The gear 24 is connected to the shutter charging mechanism within the camera body 1.

In the case of hand held cameras, the grip must be firm and this is provided by the camera herein described by the contoured cylindrical surface provided on the film holder. In addition to the firm grip provided, the comparative heavy film advancing mechanism, spools and film are virtually in the palm of the user. There is thus very little unbalanced weight to contend with, most of the weight being in the right hand grip of the user. The other surfaces of the camera are smooth and what little unbalanced weight there is, is readily balanced by the left hand of the user. Holding the camera steady for either horizontal or vertical pictures presents no problem. In either position most of the weight is carried by the right hand and the left hand can more easily make the necessary lens or shutter speed adjustments. In addition, the right side and lower surfaces of the camera are plane surfaces to which mounting nuts may be secured for fitting a tripod or to attach accessories on camera body.

FIG. 1 shows a partial front view of a reflex camera, in which the film chamber being formed in unison with the camera body.

While the embodiment of the invention has been illustrated as a camera with a removable film holder, it will be understood that the present invention can also be applied to a camera wherein the film holder and the camera body are made integral.

What is claimed is:
1. A single lens reflex camera comprising in combination,
   a camera body;
   a reflex mirror housing secured to the front wall of the camera body;
   a lens securable in the mirror housing;
   a film holder removably secured on the rear wall of the camera body and having slidable light shield means for shielding the film from extraneous light when said film holder is removed from the camera body;
   a push button on the film holder; and
   contacting means on the camera body being interconnected with the push button when the film holder is secured to the camera body to operate the shutter mechanism of the camera.

2. A reflex camera according to claim 1 further comprising
   a gear on the camera body connected to the shutter charging mechanism of the camera; and
   a film advance mechanism in the film holder including a supply spool, a take-up spool and a gear for advancing the film; said gear on the camera body and said advancing gear meshing with each other when the film holder is secured to the camera body.

3. A reflex camera according to claim 2, wherein the film holder is L-shaped with a cylindrical portion extending beyond the side wall of the camera body, the outer surface of said cylindrical portion being contoured to be used as a grip, and includes a pressure plate and guide rollers for guiding the film first one way and then the opposite way along the longitudinal direction of the film holder from the supply spool to the take-up spool in said cylindrical portion.

References Cited

UNITED STATES PATENTS

| | | | |
|---|---|---|---|
| 2,513,017 | 6/1950 | Foresman | 95—34 |
| 2,609,739 | 9/1952 | Tatro | 95—34 |
| 2,949,838 | 8/1960 | Skalabrin | 95—86 |
| 2,960,017 | 11/1960 | Kopp et al. | 95—34 X |
| 3,185,058 | 5/1965 | Singer | 95—42 |

NORTON ANSHER, *Primary Examiner.*

CHARLES B. FUNK, *Assistant Examiner.*

U.S. Cl. XR

95—53